United States Patent [19]

Sarma et al.

[11] Patent Number: 4,542,004

[45] Date of Patent: Sep. 17, 1985

[54] PROCESS FOR THE HYDROGENATION OF SILICON TETRACHLORIDE

[75] Inventors: Kalluri R. Sarma, Mesa; Charles S. Chanley, Scottsdale, both of Ariz.

[73] Assignee: Solavolt International, Houston, Tex.

[21] Appl. No.: 594,167

[22] Filed: Mar. 28, 1984

[51] Int. Cl.$^4$ .................................. C01B 33/107
[52] U.S. Cl. .................... 423/342; 423/341; 423/347; 423/DIG. 10; 204/164
[58] Field of Search ....... 423/342, 347, 341, DIG. 10; 204/164

[56] References Cited

U.S. PATENT DOCUMENTS

| | | | |
|---|---|---|---|
| 2,406,605 | 8/1946 | Hurd | 423/342 |
| 2,458,703 | 1/1949 | Hatcher | 423/342 |
| 2,877,097 | 3/1959 | Wolff | 423/341 |
| 3,126,248 | 3/1964 | Pohl et al. | 423/342 |
| 4,309,259 | 1/1982 | Sarma et al. | 204/164 |
| 4,321,246 | 3/1982 | Sarma et al. | 423/342 X |

Primary Examiner—William R. Dixon, Jr.
Assistant Examiner—Steven Capella
Attorney, Agent, or Firm—John A. Fisher

[57] ABSTRACT

An improved process is disclosed for the high pressure plasma hydrogenation of silicon tetrachloride. Hydrogen and silicon tetrachloride are reacted in the presence of a high pressure plasma and further in the presence of a boron catalyst to form trichlorosilane and dichlorosilane. By adding the boron catalyst the overall conversion efficiency is increased and the dichlorosilane content in the reaction effluent is increased.

8 Claims, 1 Drawing Figure

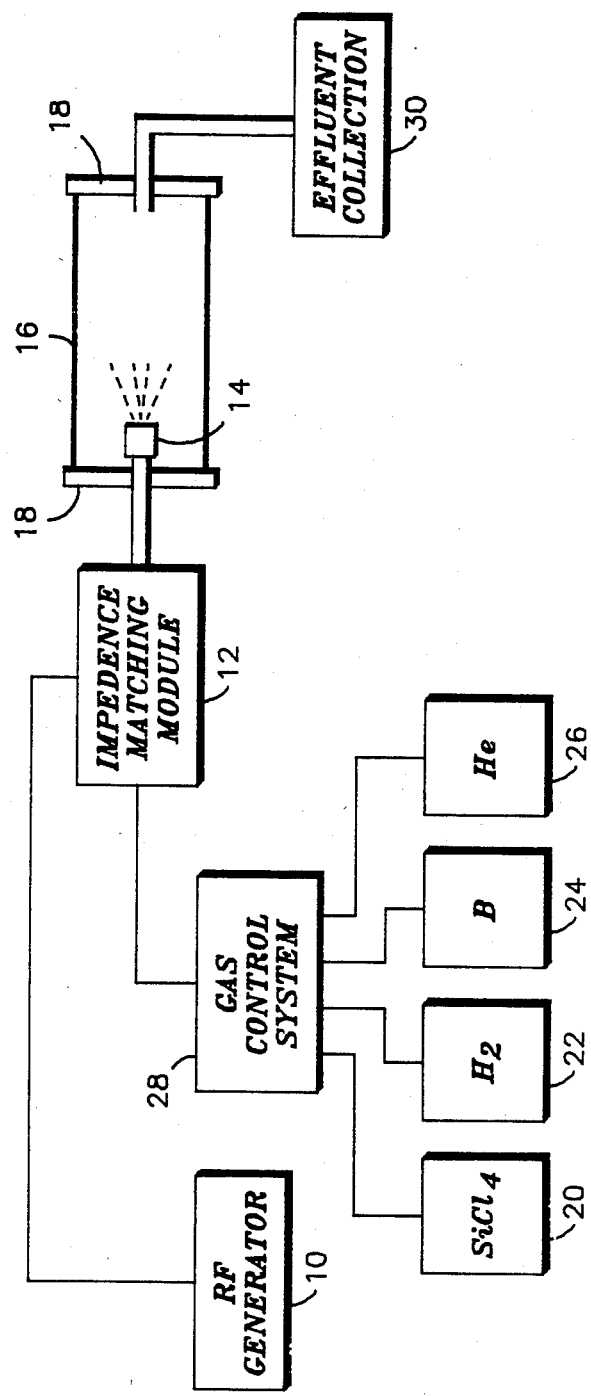

PROCESS FOR THE HYDROGENATION OF SILICON TETRACHLORIDE

BACKGROUND OF THE INVENTION

This invention relates generally to a process for the high pressure plasma hydrogenation of silicon tetrachloride, and more specifically to a boron catalyzed reaction for the hydrogenation of silicon tetrachloride.

Most silicon produced today for the semiconductor industry is made by a process wherein trichlorosilane is reduced with hydrogen to deposit polycrystalline silicon on a heated substrate. A large portion of the trichlorosilane used in the reaction is not converted to elemental silicon, however, but instead is converted to silicon tetrachloride. Despite its silicon content, silicon tetrachloride is essentially a low value waste by-product of the reaction. The cost of producing silicon is thus increased by the low efficiency of available silicon usage. One way to reduce the overall cost of producing silicon is to recycle the silicon tetrachloride and convert it into a more usable silicon bearing reactant.

One process for the hydrogenation of silicon tetrachloride to produce trichlorosilane and dichlorosilane is described in U.S. Pat. No. 4,309,259. That patent describes a process whereby silicon tetrachloride is hydrogenated in the presence of a high pressure plasma (HPP) to produce the more valuable silicon bearing compounds in a reaction represented by the equation

$$H_2 + SiCl_4 \xrightarrow{HPP} SiHCl_3 + SiH_2Cl_2 + HCl.$$

The SiCl$_4$ hydrogenation (conversion) efficiency of this process depends mainly on the H$_2$SiCl$_4$ ratio in the process input gas stream and on the RF power of the HPP plasma. Increasing the H$_2$/SiCl$_4$ ratio in the reactor input gases increases the SiCl$_4$ conversion efficiency. The maximum usable H$_2$/SiCl$_4$ ratio (and thus the maximum SiCl$_4$ conversion efficiency), however, is determined by the onset of chlorosilane polymer formation at high H$_2$/Sil$_4$ ratios. The chlorosilane polymers are oily, shock sensitive, hazardous materials which are highly undesirable because of safety considerations. Even very small amounts of polymer formation must be avoided because the polymer deposits on reactor walls and process piping and with time gradually builds up to dangerous levels.

For a given SiCl$_4$ feed rate and H$_2$/SiCl$_4$ ratio, conversion efficiency increases initially with an increase in RF power, reaches a maximum, and then decreases with further increases in RF power. With a particular high pressure plasma reactor apparatus and with a H$_2$/SiCl$_4$ ratio of 4.2, an RF power level of 1.7 KW, and a SiCl$_4$ feed rate of 10.7 gm/min, a conversion efficiency of 49.9% is achieved without any noticeable polymer formation. In this reaction the chlorosilane composition in the output of the HPP reactor is measured to be 50.1% SiCl$_4$, 41.3% SiHCl$_3$, and 8.6% SiH$_2$Cl$_2$. The 49.9% conversion efficiency is very high and very cost effective compared to alternate technologies for hydrogenating SiCl$_4$.

Despite the high conversion efficiency of the HPP hydrogenation reaction described in U.S. Pat. No. 4,309,259, however, there is a need for a process for the hydrogenation of silicon tetrachloride which achieves still higher conversion efficiencies, decreases the RF power requirement, and increases the SiH$_2$Cl$_2$ content of the reaction. It is therefore an object of this invention to provide an improved process for the catalyzed hydrogenation of silicon tetrachloride.

It is a further object of this invention to provide a process for the hydrogenation of SiCl$_4$ which produces enhanced quantities of SiHCl$_2$.

BRIEF SUMMARY OF THE INVENTION

The foregoing and other objects and advantages of the invention are achieved through the use of a catalyzed high pressure plasma hydrogenation reaction. Hydrogen and silicon tetrachloride are reacted in the presence of a high pressure plasma and further in the presence of a boron or aluminum catalyst to produce dichlorosilane and trichlorosilane. The boron catalyst can be in the form, for example, of diborane or boron trichloride. The aluminum catalyst can be in the form, for example, of aluminum trichloride.

BRIEF DESCRIPTION OF THE DRAWING

The sole FIGURE illustrates HPP apparatus for practice of the invention.

DETAILED DESCRIPTION OF PREFERRED EMBODIMENTS

The sole FIGURE illustrates apparatus in which the hydrogenation process, in accordance with the invention, can be practiced. Similar apparatus is described in more detail in U.S. Pat. No. 4,309,259. The deposition apparatus includes means for generating a high pressure RF plasma. By high pressure plasma (HPP) is meant a plasma generated at pressures greater than about 100 torr (about 13.3 KPa), and preferably at pressures near 1 atmosphere. The apparatus includes an RF generator 10 and an impedance matching module 12. As explained more fully in U.S. Pat. No. 4,309,259, the impedance matching module can be, for example, a $\pi$ network wherein the inductor is a hollow coil through which reactant gases can pass. When the impedance matching module is properly tuned, a high voltage exists at the output of the module. This high voltage, capable of generating a plasma, is coupled to a high pressure plasma nozzle 14. Reactants pass through the coil to the HPP nozzle where a plasma is generated by the high voltage. The high pressure plasma nozzle is positioned within a reaction chamber 16 within which the ambient can be controlled. Reaction chamber 16, for example, can be a quartz tube sealed at the ends by end caps 18. In the practice of the invention, reactants including silicon tetrachloride 20, hydrogen 22, a catalyst such as boron from source 24 and an inert gas 26 such as helium are coupled to a gas control system 28. The gas control system provides for the control and metering of each of the reactant gases. From the gas control system the proper mixture of gases is conveyed to the impedance matching module and then to the HPP nozzle 14.

In practice of the invention, the system is first flushed with an inert gas such as helium. Hydrogen is then flowed through the system and the high pressure plasma is generated. After generating the plasma and properly adjusting the impedance matching module, silicon tetrachloride and a boron or aluminum catalyst is added to the plasma stream. Preferably the catalyst is boron in the form of B$_2$H$_6$ or BCl$_3$. Effluent from the reaction is conveyed from the reaction chamber and is collected at 30 for separation, purification, removal of the catalyst material, and the like.

The following non-limiting examples represent best modes contemplated by the inventors and serve to further illustrate the invention.

EXAMPLE I

Silicon tetrachloride was hydrogenated in apparatus as depicted in the FIGURE. The $SiCl_4$ feed rate was maintained at 12 gm/min. The RF power was adjusted to 1.3 KW and the hydrogen flow rate was adjusted to vary the $H_2/SiCl_4$ ratio. Experiments were run with and without the addition of $B_2H_6$ to the reactant gas flow. The $B_2H_6$ flow was measured in terms of parts per million (ppm) of the total reactant gas flow. The effluent from the reactor was collected and analyzed by gas chromatography. Results of the experiment are shown in Table 1.

Table 1 shows the effect of trace amounts of $B_2H_6$ on the hydrogenation of $SiCl_4$ as the $H_2/SiCl_4$ ratio is varied. In each instance the $SiCl_4$ conversion efficiency is enhanced by the addition of $B_2H_6$ to the reaction. In addition, the conversion of $SiCl_4$ to $SiH_2Cl_2$ is enhanced, with the $SiH_2Cl_2$ representing more than 25% of the effluent for $H_2/SiCl_4$ ratios of 10.1 with 6.4 ppm of $B_2H_6$. No polymer formation was observed even at a $H_2/SiCl_4$ ratio of 10.1 with the addition of 6.4 ppm of $B_2H_6$. Considerable polymer formation was observed, however, under similar conditions without the $B_2H_6$. In the absence of $B_2H_6$, polymer formation was observed for $H_2/SiCl_4$ ratios greater than 6. Mass spectroscopic analysis of the HPP reactor effluent gases indicates that the $B_2H_6$ is converted to $BCl_3$ in the HPP plasma.

EXAMPLE II

Hydrogenation reactions were carried out in the apparatus as illustrated in the FIGURE using a $H_2/SiCl_4$ ratio of 5.19, an RF power of 1.5 KW, and a $SiCl_4$ feed rate of 12 gm/min. The amount of $B_2H_6$ added to the input reactants was varied to show the effect of boron concentration on silicon tetrachloride hydrogenation. Results of the reactions are shown in Table 2.

In the range of concentrations of boron (5 ppm to 15 ppm) shown in Table 2, concentration is not a major influence on the catalytic activity of boron on the $SiCl_4$ hydrogenation. In further reactions, $B_2H_6$ concentrations from 0.1 ppm to 35 ppm have exhibited the catalytic property with little concentration dependence.

ratios by eliminating polymer formation. This in turn increases the $SiH_2Cl_2$ content in the HPP reactor effluent gas stream and increases the $SiCl_4$ conversion efficiency. At the same time, the catalyst decreases the RF plasma power requirement for the $SiCl_4$ hydrogenation process.

Thus it is apparent that there has been provided, in accordance with the invention, an improved $SiCl_4$ hydrogenation process which fully meets the objects and advantages set out above. While the invention has been described and illustrated with respect to specific embodiments thereof, it is not intended that the invention be limited to these illustrative embodiments. Those skilled in the art will realize, after review of the foregoing detailed description, that variations and modifications departing from these embodiments are possible without departing from the spirit and scope of the invention. Other HPP apparatus than that described in U.S. Pat. No. 4,309,259, for example, can be utilized in practicing the process. While that patent discloses apparatus including a dual flow HPP nozzle, the process can be carried out using a single flow nozzle of graphite or the like. Accordingly, it is intended to encompass all such variations and modifications as fall within the scope of the appended claims.

We claim:

1. An improved process for the hydrogenation of $SiCl_4$ by the reaction of hydrogen and silicon tetrachloride in the presence of a high pressure plasma wherein the improvement comprises: adding a catalyst comprising boron to said reaction.

2. An improved process for the production of $SiH_2Cl_2$ from $SiCl_4$ which comprises the steps of: reacting $SiCl_4$ and $H_2$ in the presence of a high pressure plasma and further in the presence of a boron catalyst.

3. The improved process of claim 2 wherein said $SiCl_4$ and $H_2$ are present in said step of reacting in a ratio $H_2/SiCl_4$ greater than about 6.

4. An improved process for the hydrogenation of $SiCl_4$ by the reaction of hydrogen and silicon tetrachloride in the presence of a high pressure plasma wherein the improvement comprises: adding a catalyst comprising $B_2H_6$ to said reaction.

5. The improved process of claim 4 wherein said $B_2H_6$ is added in an amount between about 0.1 ppm and 35 ppm.

TABLE 1

| HPP REACTOR EFFLUENT COMPOSITION | $H_2/SiCl_4$ | 5.19 | | 6.07 | | 7.08 | | 8.01 | | 10.1 |
|---|---|---|---|---|---|---|---|---|---|---|
| | $C_{B_2H_6}$ (PPM) | 0 | 10.2 | 0 | 8.9 | 0 | 7.8 | 0 | 7.0 | 6.4 |
| $SiH_2Cl_2$ (%) | | 1.6 | 6.6 | 2.3 | 10.1 | 2.6 | 13.5 | 3.5 | 22.3 | 25.3 |
| $SiHCl_3$ (%) | | 33.9 | 41.0 | 41.1 | 42.6 | 43.5 | 40.3 | 41.5 | 27.4 | 28.5 |
| $SiCl_4$ Conv. Efficiency (%) | | 35.3 | 47.6 | 43.4 | 52.7 | 46.1 | 53.8 | 45.0 | 49.7 | 53.08 |

TABLE 2

| HPP REACTOR EFFLUENT COMPOSITION | $C_{B_2H_6}$ (PPM) | 15.0 | 10.0 | 5.0 | 0.0 |
|---|---|---|---|---|---|
| $SiH_2Cl_2$ (%) | | 4.9 | 5.0 | 5.8 | 2.2 |
| $SiHCl_3$ (%) | | 42.4 | 44.4 | 45.5 | 44.7 |
| $SiCl_4$ Conv. Efficiency (%) | | 47.3 | 49.4 | 51.3 | 46.9 |

Although the inventors do not wish to be bound by any particular theory, it is believed that the boron acts as a catalyst in (a) enhancing the conversion to $SiH_2Cl_2$ and (b) eliminating polymer formation. The use of trace quantities of catalyst allows the use of higher $H_2/SiCl_4$ 6. An improved process for the hydrogenation of $SiCl_4$ by the reaction of hydrogen and silicon tetrachloride in the presence of a high pressure plasma wherein the improvement comprises: adding a catalyst comprising $BCl_3$ to said reaction.

7. An improved process for the production of $SiH_2Cl_2$ from $SiCl_4$ which comprises the steps of: reacting $SiCl_4$ and $H_2$ in the presence of a high pressure plasma in a ratio of $H_2/SiCl_4$ greater than about 6 further in the presence of a catalyst comprising $B_2H_6$.

8. The improved process of claim 7 wherein said $B_2H_2$ is present in an amount between 0.1 ppm and 35 ppm.

* * * * *